US008885278B2

(12) United States Patent
Asakura

(10) Patent No.: US 8,885,278 B2
(45) Date of Patent: Nov. 11, 2014

(54) MAGNETIC DISK APPARATUS AND CONTROL METHOD OF MAGNETIC HEADS

(71) Applicant: Kabushiki Kaisha Toshiba, Tokyo (JP)

(72) Inventor: Makato Asakura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/973,946

(22) Filed: Aug. 22, 2013

(65) Prior Publication Data

US 2014/0300991 A1    Oct. 9, 2014

(51) Int. Cl.
*G11B 21/02* (2006.01)
*G11B 5/09* (2006.01)

(52) U.S. Cl.
USPC ............................................... 360/48; 360/75

(58) Field of Classification Search
USPC ............ 360/48, 75, 39, 53, 61, 63, 70, 73.12, 360/77.305, 77.08, 78.04, 78.09
See application file for complete search history.

(56) References Cited

U.S. PATENT DOCUMENTS

| 6,538,835 | B1 * | 3/2003 | Burton ............................ 360/63 |
| 6,757,118 | B1 * | 6/2004 | Walker et al. ................... 360/31 |
| 7,463,438 | B2 | 12/2008 | Kosugi et al. |
| 7,589,925 | B1 * | 9/2009 | Chiao et al. ..................... 360/48 |
| 7,679,851 | B1 * | 3/2010 | Sun et al. ........................ 360/48 |
| 7,679,854 | B1 * | 3/2010 | Narayana et al. ............... 360/63 |
| 2007/0211368 | A1 * | 9/2007 | Shibano et al. ................. 360/75 |

FOREIGN PATENT DOCUMENTS

| JP | H04-328369 A | 11/1992 |
| JP | H07-262718 A | 10/1995 |
| JP | 2006-114142 A | 4/2006 |

* cited by examiner

*Primary Examiner* — Nabil Hindi
(74) *Attorney, Agent, or Firm* — Patterson & Sheridan, LLP

(57) ABSTRACT

A seek control section is configured so that when a magnetic head is within a prescribed range from a zone boundary when there is a head change request, the magnetic head is driven to seek in a stable region, and then the magnetic head is changed from a current head to a target head. After the change from the current head to the target head, the target head is driven to seek the target position.

20 Claims, 6 Drawing Sheets

MAGNETIC DISK APPARATUS AND CONTROL METHOD OF MAGNETIC HEADS

CROSS-REFERENCE TO RELATED APPLICATION

This application is based upon and claims the benefit of priority from Japanese Patent Application No. 2013-079532, filed Apr. 5, 2013, the entire contents of which are incorporated herein by reference.

FIELD

Embodiments described herein relate to a magnetic disk apparatus and a control method for magnetic heads.

BACKGROUND

In a magnetic disk apparatus, in order to increase the data area for writing user data, a servo pattern may be divided into plural zones from the inner periphery to the outer periphery of the magnetic disk, so that the writing frequency of the servo pattern for the zone on the outer peripheral side is higher than that for the zone on the inner peripheral side.

DETAILED DESCRIPTION

Embodiments provide a magnetic disk apparatus and a control method for magnetic heads, wherein a seek operation can be stabilized for a magnetic disk having a servo pattern with different write frequencies recorded thereon.

In general, with reference to the annexed figures, the magnetic disk apparatus according to the embodiments will be explained in detail. However, the present disclosure is not limited to these embodiments.

A magnetic disk apparatus according to one embodiment includes a first magnetic disk, a second magnetic disk, a first magnetic head, a second magnetic head, and a seek control section. For each of the first and second magnetic disks, servo patterns are divided into plural zones for recording at different write frequencies. The first magnetic head is arranged to correspond to the first magnetic disk. The second magnetic head is arranged to correspond to the second magnetic disk. Under control of the seek control section, according to the seek request to switch from the first magnetic head to the second magnetic head, before switching from the first magnetic head to the second magnetic head, the first magnetic head is driven from a current position to a zone servo stable region where the write frequencies of the servo pattern read by the first and second magnetic heads are in agreement with each other and then the magnetic head is changed from the first magnetic head to the second magnetic head, after which the second magnetic head is driven to seek a target position.

First Embodiment

Figure 1:
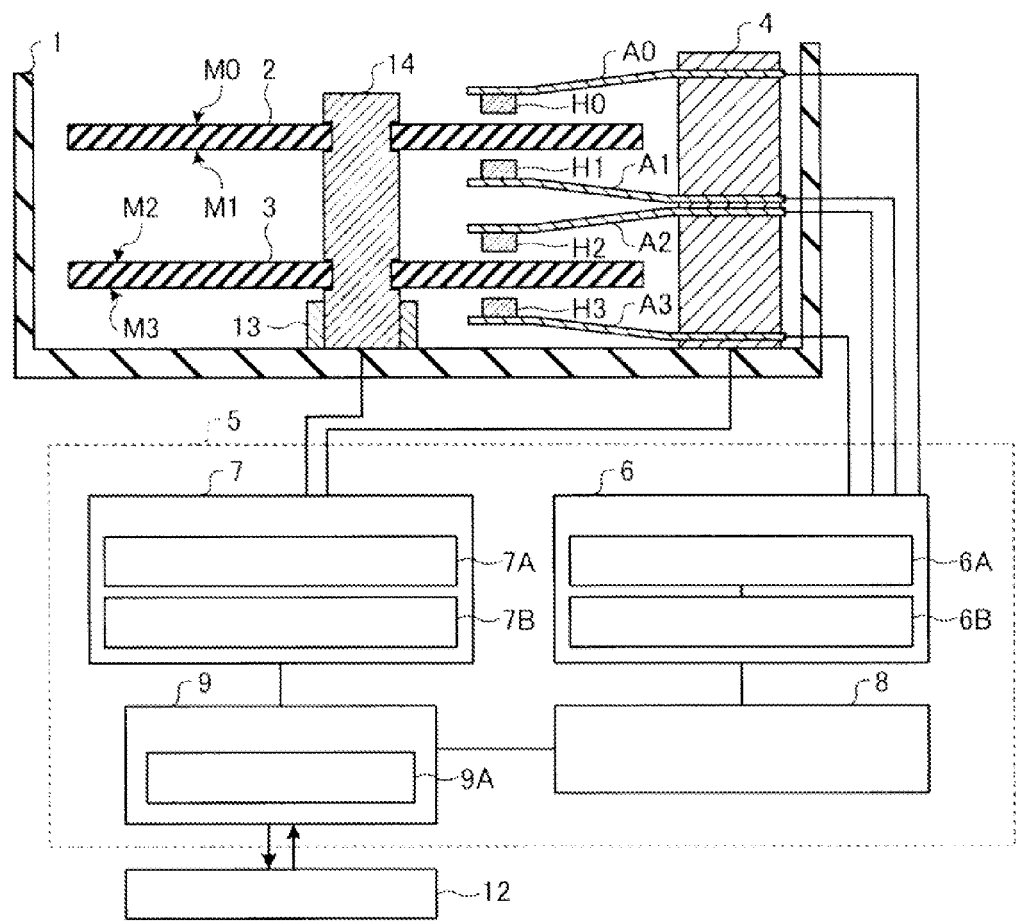
FIG. 1 is a schematic block diagram illustrating the configuration of a magnetic disk apparatus according to a first embodiment.

FIG. 1 is a block diagram illustrating the configuration of a magnetic disk apparatus according to a first embodiment.

In FIG. 1, in the magnetic disk apparatus, plural magnetic disks 2, 3 are arranged. On the two surfaces of the magnetic disk 2, disk surfaces M0, M1 are arranged, respectively, and, on the two surfaces of the magnetic disk 3, the disk surfaces M2, M3 are arranged, respectively. Here, the magnetic disks 2, 3 are monolithically supported via a spindle 14.

In addition, in the magnetic disk apparatus, magnetic heads H0 through H3 are arranged for the disk surfaces M0 through M3, respectively. The magnetic heads H0 through H3 are set facing the disk surfaces M0 through M3, respectively. Here, the magnetic heads H0 through H3 are held on the disk surfaces M0 through M3, respectively, via the arms A0 through A3, respectively. The arms A0 through A3 can make the respective magnetic heads H0 through H3 slide in the horizontal plane.

Figure 2A:
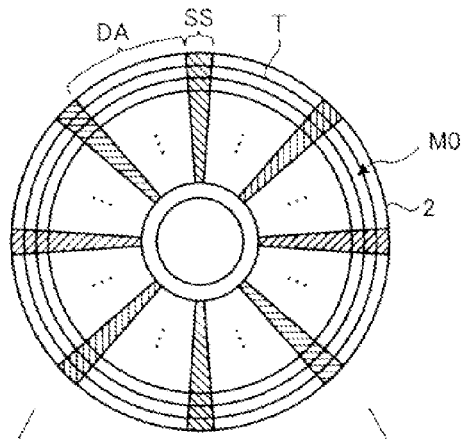
FIG. 2A is a plane view illustrating the track configuration for the magnetic disk shown in FIG. 1.

Here, as shown in FIG. 2A, for example, on the disk surface M0, tracks T are arranged in the circumferential direction. On each of the tracks T, a data area DA wherein the user data are written and a servo area SS wherein the servo data are written are arranged. In FIG. 2A, the servo areas SS are arranged in a radiating configuration, while the data areas DA are arranged between the servo areas SS, respectively.

Figure 2B:
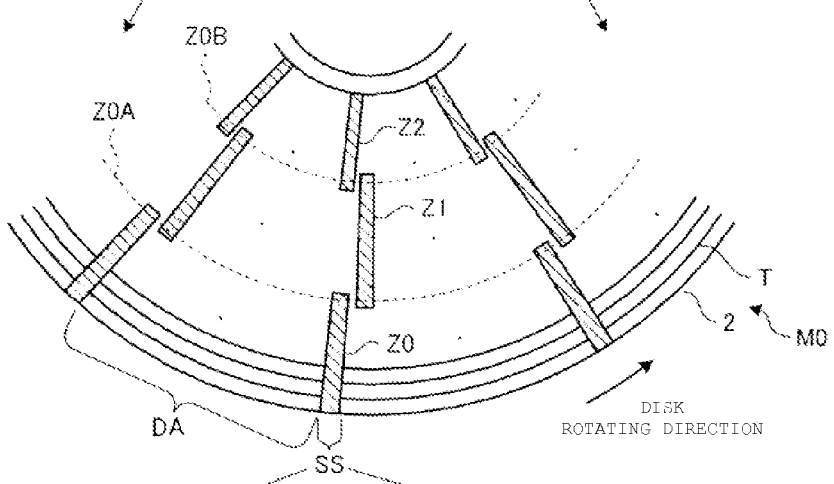
FIG. 2B is a diagram illustrating a servo area divided into different zones.

In FIG. 2B, the servo areas SS are each divided into zones Z0 through Z2, and they are arranged shifted from each other in the circumferential direction for the zones Z0 through Z2. In this case, the zones Z0, Z1 have their end portions overlapped via a gap between them, and the zones Z1, Z2 have their end portions overlapped via a gap between them. A zone boundary Z0A is arranged near the track where the zones Z0, Z1 overlap, and a zone boundary Z0B is arranged near the track where the zones Z1, Z2 overlap. In the example shown in FIG. 2B, the method whereby the servo area SS is divided into two or more zones (e.g., three zones Z0 through Z2) will be explained below. The zones Z0 through Z2 are formed so that the write frequencies for the servo area SS are different. In the example shown in FIG. 2B, for the zone Z0 on the outer peripheral side, the write frequency as the reference frequency of the servo pattern is higher than that of the zone Z2 on the inner peripheral side. For example, a write frequency for the zone Z0 may be set at 200 MHz, a write frequency for the zone Z1 may be set at 150 MHz, and a write frequency for the zone Z2 may be set at 100 MHz. Here, the write frequency on the outer peripheral side is set higher than that on the inner peripheral side. Compared with the case where a constant write frequency is adopted for all of the zones Z0 through Z2, it is possible to decrease the space of the zones Z0, Z1, and it is possible to increase the data area DA. In addition, for the disk surfaces M1 through M3, the servo areas SS are also divided each to zones Z0 through Z2 for recording just as the disk surface M0.

Figure 2C:
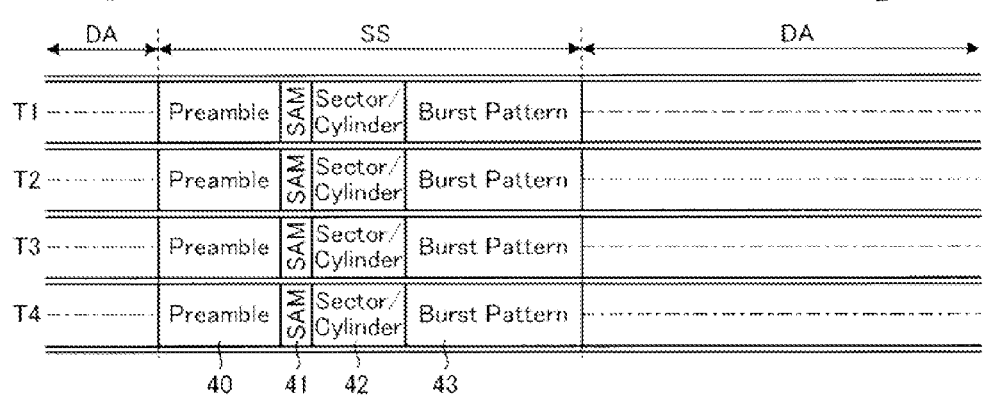
FIG. 2C is a diagram illustrating an example configuration of the servo area shown in FIG. 2B.

As shown in FIG. 2C, for the servo area SS, a preamble 40, a servo area mark 41, a sector/cylinder information 42, and a burst pattern 43 are written. The sector/cylinder information 42 provides the servo address in the circumferential direction and the radial direction on the disk surface M0 and can be adopted in the seek control wherein the magnetic head H0 is driven to move to the target track. The burst pattern 43 can be adopted in the tracking control for positioning the magnetic head H0 in the range of the target track. This burst pattern 43 may be a null-type burst pattern or an area-type burst pattern. The burst pattern may also be a phase difference-type pattern.

Also, as shown in FIG. 1, for the magnetic disk apparatus, a voice coil motor 4 for driving arms A0 through A3 is arranged, and, at the same time, a spindle motor 13 for rotating the magnetic disks 2, 3 is arranged via the spindle 14. The magnetic disks 2, 3, the magnetic heads H0 through H3, the arms A0 through A3, the voice coil motor 4, the spindle motor 13, and the spindle 14 are accommodated in a case 1.

In addition, a magnetic recording control section 5 is arranged in the magnetic disk apparatus. The magnetic recording control section 5 has the following parts: a head control section 6, a power control section 7, a read/write channel 8, and a hard disk control section 9. In the head control section 6, a write current control section 6A and a reproduced signal detecting section 6B are arranged. In the power control section 7, a spindle motor control section 7A and a voice coil motor control section 7B are arranged. In the hard disk control section 9, a seek control section 9A is arranged. The processing of the seek control section 9A is carried out by the firmware executed by a CPU.

The head control section 6 amplifies the signal in the recording/reproduction operation. The write current control section 6A controls the write current flowing in the magnetic heads H0 through H3. The reproduced signal detecting section 6B detects the signal read by the magnetic heads H0 through H3. The power control section 7 drives the voice coil motor 4 and the spindle motor 13. The spindle motor control section 7A controls the rotation of the spindle motor 13. The voice coil motor control section 7B can control the driving of the voice coil motor 4. The read/write channel 8 converts the signal reproduced by the magnetic heads H0 through H3 to a data format handled by a host 12 and converts the data output from the host 12 to the signal format recorded by the magnetic heads H0 through H3. Examples of such format conversions include DA conversion and encoding. In addition, the read/write channel 8 carries out the decoding processing for the signal reproduced by the magnetic heads H0 through H3 and makes code modulation for the data output from the host 12. Under the instruction from the host 12, the hard disk control section 9 carries out recording/reproduction control or transfer of data between the host 12 and the read/write channel 8. The seek control section 9A works to ensure stable seeking of the magnetic heads H0 through H3 to the target position.

Also, the magnetic recording control section 5 is connected to the host 12. The host 12 may be a personal computer or an external interface for issuing the write instruction or the read instruction for the magnetic disk apparatus.

While the magnetic disks 2, 3 are driven to rotate by the spindle motor 13, the signals are read from the disk surfaces M0 through M3 via the magnetic heads H0 through H3, respectively, and they are detected by the reproduced signal detecting section 6B. The signal detected with the reproduced signal detecting section 6B is subject to data conversion by the read/write channel 8, and then, the signal is sent to the hard disk control section 9. Next, the hard disk control section 9 carries out tracking control for the magnetic heads H0 through H3 on the basis of the burst pattern 43 included in the signal detected by the reproduced signal detecting section 6B.

In addition, on the basis of the sector/cylinder information 42 included in the signal detected by the reproduced signal detecting section 6B, the current positions of the magnetic heads H0 through H3 are computed, and the seek control is carried out so that the magnetic heads H0 through H3 approach the target position. Here, when the magnetic heads H0 through H3 are within the prescribed range from the zone boundaries Z0A, Z0B while there is a seek request requiring the head change, the magnetic heads H0 through H3 are made to seek a position in the zone servo stable region, after which the magnetic heads H0 through H3 can be made to seek the target position. This zone servo stable region can be set so that the write frequencies of the servo patterns read by the magnetic heads H0 through H3 are in agreement with each other.

For example, suppose when the magnetic head H0 is near the zone Z0A, a seek request requiring the head change from the magnetic head H0 to the magnetic head H3 is made. In this case, when the magnetic head H0 is in the zone Z0 of the disk surface M0 and the magnetic head H3 is in the zone Z1 of the disk surface M3 due to the eccentricity of the magnetic disks 2, 3, the magnetic head H0 is driven to move to the zone Z1 before the head change from the magnetic head H0 to the magnetic head H3, and then the head change from the magnetic head H0 to the magnetic head H3 is carried out. Consequently, it is possible to prevent frequencies in the servo reproduction signals from differing from each other between the magnetic heads H0 and H3 in the head change seek operation, and it is possible to prevent the detection of the servo data from taking a long time. Consequently, stabilizing the seek operation is possible.

Figure 3A:
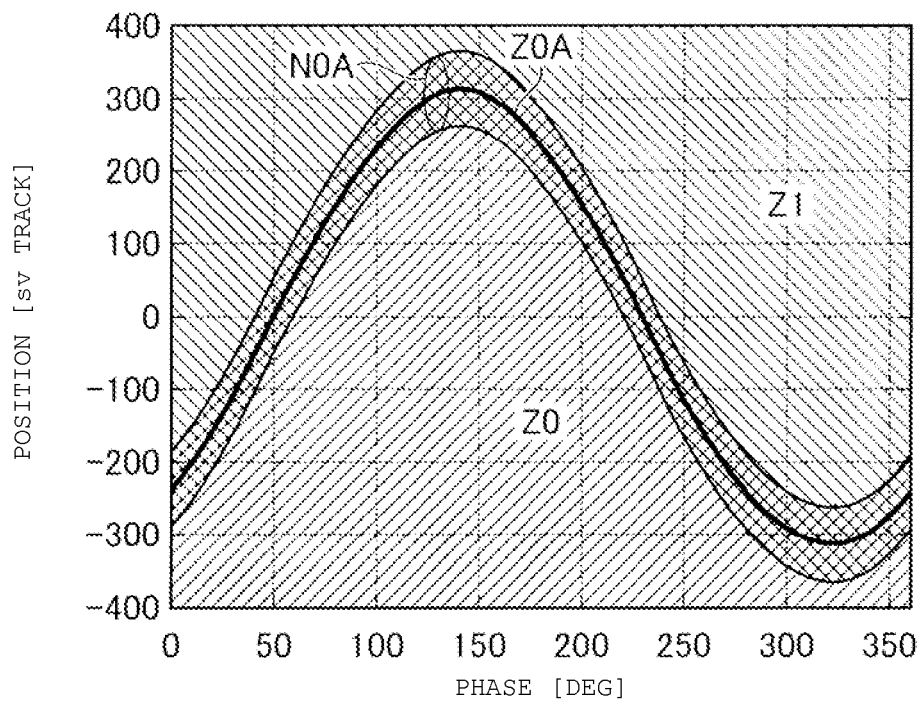
FIG. 3A is a diagram illustrating an example of the change in the zone boundary caused by the eccentricity of the magnetic disk.
Figure 3B:
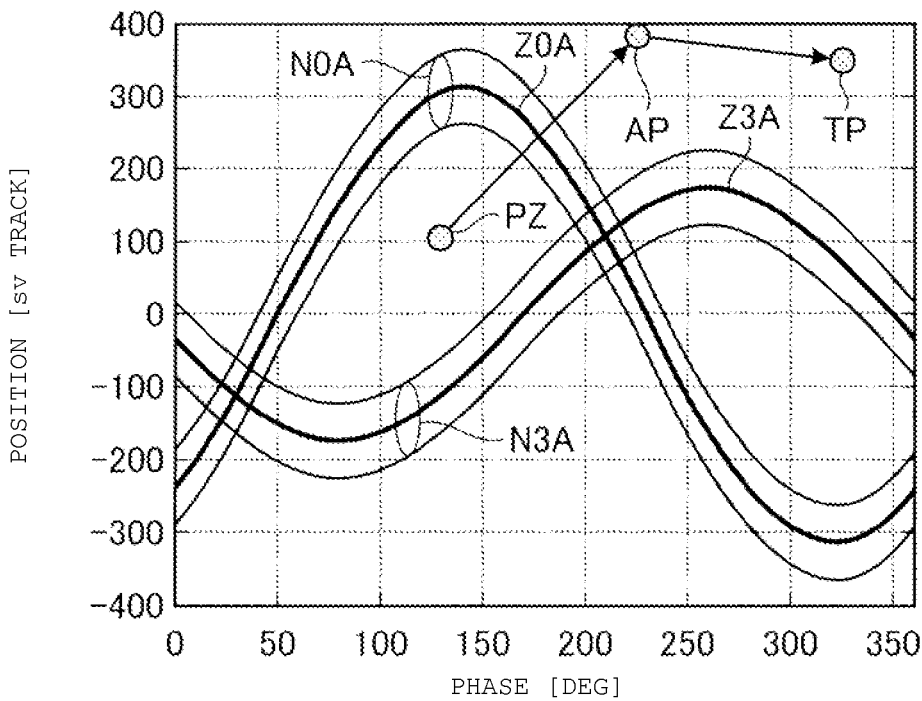
FIG. 3B is a diagram illustrating an example of the change in the zone boundary on the disk surfaces of different magnetic disks.

FIG. 3A is a diagram illustrating an example of change in the zone boundary due to the eccentricity of the magnetic disks. FIG. 3B is a diagram illustrating an example of the change in the zone boundary on the disk surfaces of the different magnetic disks.

As shown in FIG. 3A, a zone boundary Z0A is arranged between the zones Z0, Z1 on the disk surface M0. Near the zone boundary Z0A, a discarded region N0A wherein the recording of data is difficult due to the MR offset or the like is arranged. In the example shown in FIG. 2B, because the two zones Z0, Z1 are both present in the discarded region N0A, the zones Z0, Z1 are arranged in sections with phases (the timings (rotating angles) when the zones Z0, Z1 appear on a certain track of the disk in rotation) shifted from each other. The servo data are recorded as concentric circles with respect to the rotating center in the recording. Here, due to the deviation in the rotating center caused by the eccentricity in mounting of the magnetic disk 2, the zone boundary Z0A varies with a primary sinusoidal waveform. Consequently, the servo track also varies in parallel with this zone boundary Z0A.

On the other hand, as shown in FIG. 3B, a zone boundary Z3A is arranged between the zones Z0, Z1 on the disk surface M3. In addition, near the zone boundary Z3A, a discarded region N3A where data recording is difficult is arranged. On the disk surface M3, due to a deviation in the rotating center caused by the eccentricity in installing of the magnetic disk 3, the zone boundary Z3A also varies in a primary sinusoidal waveform. When the installed eccentricities of the magnetic disks 2, 3 are different, the amplitudes and phases of the primary sinusoidal waves of the zone boundaries Z0A and Z3A are different from each other. Consequently, when the current position PZ of the magnetic head H0 is in the zone Z0, for the magnetic head H3, the current position PZ may be in the zone Z1, and the frequencies of the servo reproduction signals are different between the magnetic heads H0 and H3. Consequently, it becomes impossible to detect the servo data, and the zone servo becomes unstable during the head change seek operation.

Consequently, a zone servo stable region is arranged so that the frequencies of the servo reproduction signal are always equal to each other between the magnetic heads H0 and H3 even when the installed eccentricities of the magnetic disks 2, 3 are different from each other. For example, when a seek request is made for changing the read head from the magnetic head H0 to the magnetic head H3, before changing the read head from the magnetic head H0 to the magnetic head H3, the magnetic head H0 is driven to seek the amended position AP in the zone servo stable region from the current position PZ; then, and the read head is changed from the magnetic head H0 to the magnetic head H3, after which the magnetic head H3 is then made to seek the target position TP. As a result, when a seek request is made for changing the read head from the magnetic head H0 to the magnetic head H3, even when the magnetic heads H0, H3 are near the zone boundary, it is possible to prevent the failure of the detection of the servo data, and ensure a stable seek operation.

Figure 4:
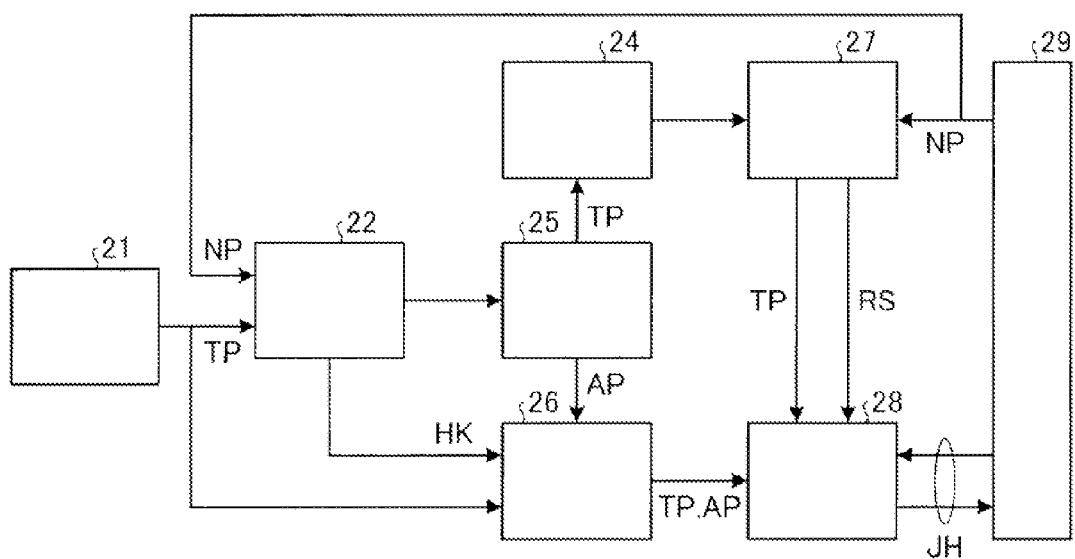
FIG. 4 is a block diagram illustrating the configuration of the seek control section shown in FIG. 1.

FIG. 4 is a block diagram illustrating the configuration of the seek control section shown in FIG. 1.

As shown in FIG. 4, the seek control section 9A includes a position control processing section 29, a seek command processing section 21, a seek means determining section 22, a target position amending section 25, a target position holding section 24, a target position selecting section 26, a seek preparing section 28, and a re-seek start determining section 27. These units may be implemented in firmware.

The position control processing section 29 can control the positions of the magnetic heads H0 through H3. The seek command processing section 21 can generate the target position TP of the magnetic heads H0 through H3 on the basis of the seek command request. The seek means determining section 22 can determine whether the magnetic heads H0 through H3 are to be driven into the zone servo stable region for seeking, on the basis of the current positions NP of the magnetic heads. The target position amending section 25 can amend the target position TP to generate the amended position AP so that the magnetic heads H0 through H3 are driven into the zone servo stable region for seeking. The target position holding section 24 can have the target position TP held before the amendment by the target position amending section 25. The target position selecting section 26 can select the target position TP or the amended position AP on the basis of the determination result from the seek means determining section 22. The seek preparing section 28 can make the position control processing section 29 execute the seek processing on the basis of the result of the selection with the target position selecting section 26. On the basis of the current positions NP of the magnetic heads H0 through H3, the re-seek start determining section 27 can instruct the seek preparing section 28 so that the magnetic heads H0 through H3 are driven for seeking the target position TP.

When the magnetic recording control section 5 receives the data access request from the host 12 via the interface section, a seek command to the data access destination is issued to the seek command processing section 21. As the seek command processing section 21 receives the seek command request, the seek command processing section generates the target position TP of the magnetic heads H0 through H3 and outputs the target position to the seek means determining section 22 and the target position selecting section 26.

As the seek means determining section 22 receives the target position TP, on the basis of the current position NP of the magnetic head, the seek means determining section 22 determines whether the magnetic heads H0 through H3 are to be driven into the zone servo stable region for seeking. This is determined based on whether the cylinder positions of the magnetic heads H0 through H3 are within a prescribed range from the zone boundary and whether the head change seek is to be carried out to the different disk surfaces M0 through M3. If the cylinder positions of the magnetic heads H0 through H3 are within the prescribed range from the zone boundary, and the head change seek operation is carried out to the different disk surfaces M0 through M3, the seek means determining section 22 sets the pre-seek flag HK and outputs the pre-seek flag to the target position selecting section 26; at the same time, the target position amending section 25 is started. If not, the pre-seek flag HK is not set, while the target position selecting section 26 is started.

When the pre-seek flag HK is not set, the target position selecting section 26 outputs the target position TP, including the target head and the target cylinder, to the seek preparing section 28. Then, the seek preparing section 28 exchanges the information JH needed for the seek preparation with the position control processing section 29; while taking the current position NP refreshed by the position control processing section 29 and the various mode states as reference, the seek preparing section carries out the setting of the various types of flags and sends a request for processing to the position control processing section 29 so that the position control processing section 29 makes a transition to an appropriate mode for the transition to the seek control. For example, if the target head of the target position TP is different from the current head of the current position NP, an operation is carried out so that, for example, the head change flag (a flag for executing the switching processing of the effective head to the target head) is set.

The position control processing section 29 executes the positioning control processing for the magnetic heads H0 through H3; according to the flag information set by the seek preparing section 28, the position control processing section sequentially makes the mode transition and finally positions the magnetic heads H0 through H3 at the requested position. For example, if the head change flag is set, first, the processing for switching the effective head to the target head is executed. When the servo detection can be carried out by the switched target head, acceleration with the highest driving current or another mode transition is carried out towards the target cylinder, and, finally, the target head is positioned at the target cylinder. In this case, with the position control processing section 29, the current position NP is continually refreshed so as to be referenced from the seek means determining section 22 and the re-seek start determining section 27.

When the seek means determining section 22 determines that a 2-step seek operation (an operation wherein, when there is a head change seek request, the magnetic head, before the change, is driven into the zone servo stable region for seeking, and the magnetic head, after the change, is driven for seeking the target position) is necessary, the pre-seek flag HK is set, and the target position amending section 25 is started; then, the target position amending section 25 has the target position TP held in the target position holding section 24, and, at the same time, the amended position AP obtained by amending the target position TP is output to the target position selecting section 26. This amended position AP is set so that the target head is substituted by the current magnetic head, and the target cylinder is driven to move to the same magnetic head as the current magnetic head. When the pre-seek flag HK is set, the target position selecting section 26 outputs the amended position AP to the seek preparing section 28.

Then, when the seek preparing section 28 receives the amended position AP, on the basis of the current magnetic head and the target head, the seek preparing section makes a determination of the necessity of switching of the current head, etc., sets the appropriate flags, and then requests the position control processing section 29 for processing so that the target head is driven to move to the target cylinder.

According to the flag information set by the seek preparing section 28, the position control processing section 29 sequentially makes a mode transition, so that the target head of the amended position AP is positioned to the target cylinder of the amended position AP. In this case, the re-seek start determining section 27 monitors the mode transition state of the position control processing section 29, and, before the seek operation to the amended position AP is determined, the re-seek request RS is started in the seek preparing section 28. In this case, the re-seek start determining section 27 outputs the target position TP that has been held by the target position holding section 24 to the seek preparing section 28. For example, the start condition for the re-seek request RS is set so that the remaining distance to the target cylinder becomes 5 servo tracks or less, and the target velocity of the normative model in the seek operation becomes 6 servo tracks/samples or lower.

After the seek preparing section 28 receives the target position TP, when the seek for a different disk surface, the head change flag is set, and the head change flag makes the request of processing on the position control processing section 29 so that the target head of the target position TP moves to the target cylinder. While the position control processing section 29 is in the state without end of the positioning of the preceding amended position AP, according to the new flag information set by the seek preparing section 28, it sequentially makes the mode transition, and the new target head of the target position TP is positioned at the new target cylinder of the target position TP. More specifically, when the switching processing of the effective head to the target head of the target position TP is executed, and the servo detection can be carried out by the switched target head, the current magnetic head is driven to move towards the target cylinder of the target position TP; finally, the magnetic head is positioned at the target position TP output from the seek command processing section 21.

Figure 5:
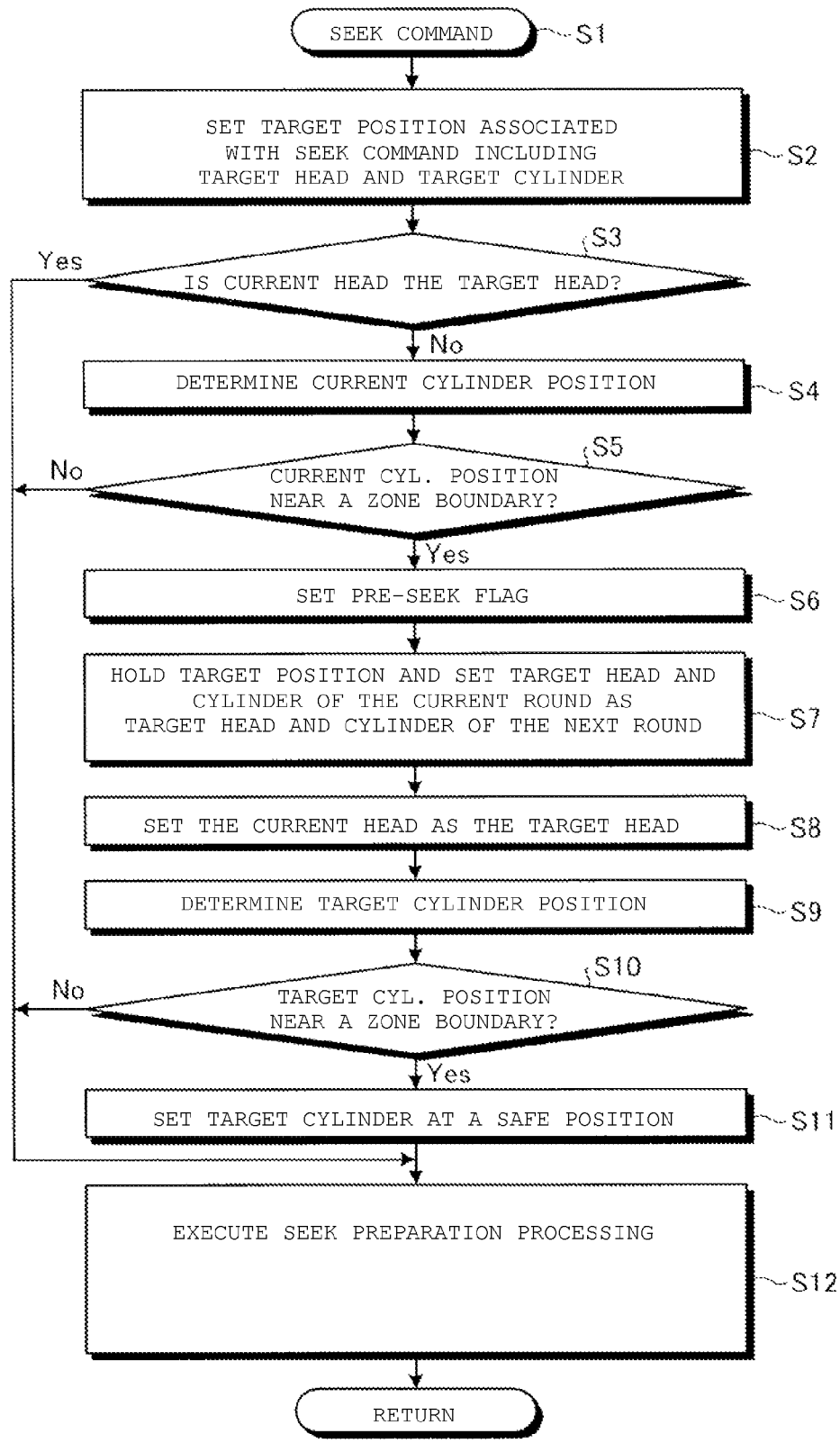
FIG. 5 is a flow chart illustrating the operation of the seek control section shown in FIG. 1.

FIG. 5 is a flow chart illustrating the operation of the seek control section shown in FIG. 1.

As shown in FIG. 5, when a seek command is issued (S1), the requested position of the magnetic head is converted to the servo address and the target head and the target cylinder are set from the servo address (S2).

Then, whether or not the target head is the current magnetic head is determined (S3). If the target head is the current magnetic head, the seek preparation processing is executed (S12). In this seek preparation processing, the seek tracking model is set so that the model is the same as the actual article. Then, the servo interruption or another control interruption is prohibited, and, after setting of the various types of flags, the control interruption is permitted.

On the other hand, when the target head is not the current magnetic head, a determination is made regarding whether the current cylinder is near the zone boundary (S4). The region near the zone boundary can be set according to the assumed eccentricity deviation. For example, the region near the zone boundary may be set as the region of ±500 cylinders corresponding to 30 μm. The flow chart shown in FIG. 5 indicates the method for determining whether the 2-step seek operation is adopted for all head change seek requests. However, for the head change between the disk surfaces M0, M1 of the same magnetic disk 2 (or the disk surfaces M2, M3 of the same magnetic disk 3), because the installed eccentricities of the disk surfaces M0, M1 (or the disk surfaces M2, M3) are in agreement with each other, even when the head change is carried out at the zone boundary, there is little risk of failure in the servo detection. Consequently, one may also adopt a scheme in which, by determining whether the head change is carried out to the different magnetic disks 2, 3, a determination is made regarding whether or not the 2-step seek operation is adopted.

If the current cylinder is not near the zone boundary, the seek preparation processing is executed (S12). On the other hand, if the current cylinder is near the zone boundary, the pre-seek flag is set (S6), and the target position hold processing is carried out (S7). In this target position holding processing, the target head of the current round (when the head change seek request is made) is set in the target head of the next round (after the head change), and the target cylinder of the current round (when the head change seek request is made) is set in the target cylinder of the next round (after the head change).

Then, the current head is set as the target head so that the head change is not carried out (S8), and the target position of seek of the first step is amended. In this amendment of the target position, a determination is made regarding whether or not the target cylinder is near the zone boundary so that the target cylinder of the seek operation of the first step is not near the zone boundary (S9). If the target cylinder is not near the zone boundary (S10), the seek preparation processing is executed (S12). On the other hand, when the target cylinder is near the zone boundary, the target cylinder is set at such a safe position that the seek operation does not become unstable (S11), and the seek preparation processing is executed (S12). For example, the target cylinder may be offset uniformly for 500 servo tracks. Here, this safe position may be set at any position if there is no risk of failure in the detection of the servo data in the head change seek operation.

Figure 6:
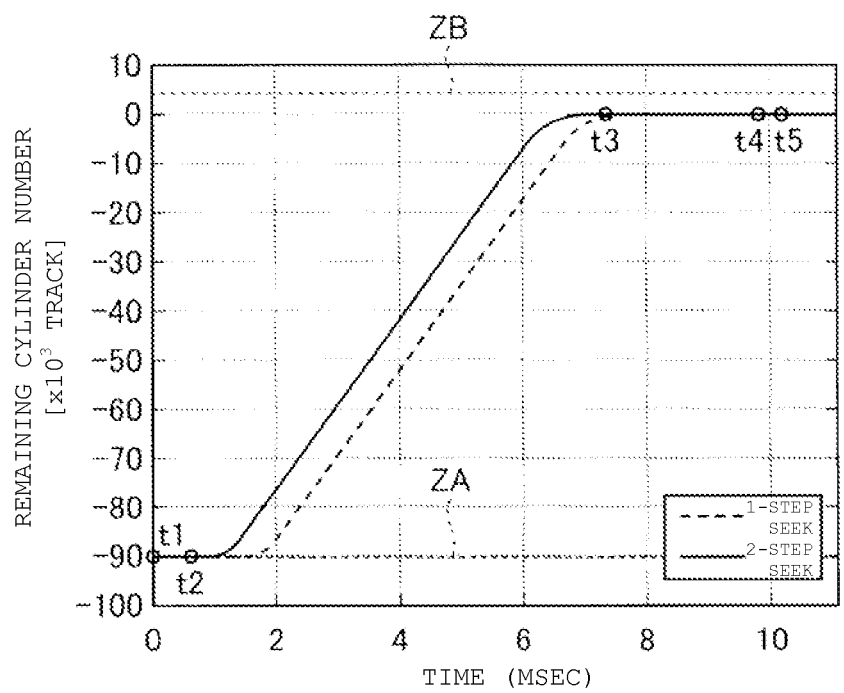
FIG. 6 is a diagram illustrating a comparison between the response waveform of a 2-step seek operation and that of the response waveform of a 1-step seek operation.

FIG. 6 is a diagram illustrating the 2-step seek response waveform as compared with the 1-step seek response waveform. In the example shown in FIG. 6, the head change seek is carried out from the magnetic head H0 to the magnetic head H3 from near the zone boundary ZA to the position not near the zone boundaries ZA, ZB.

As shown in FIG. 6, in the 1-step seek operation, the head change seek request is sent at time t1; the head change is carried out at time t2; and the head change seek is ended at time t5. At this time, in the 1-step seek operation, failure often takes place in the detection of the servo data right after switching from the magnetic head H0 to the magnetic head H3, and there is a significant delay in the start of the seek operation.

On the other hand, in the 2-step seek operation, the head change seek request is sent at time t1; the pre-seek is carried out by the same head at time t2; the head change is carried out at time t3; and the head change seek is ended at time t4. In this case, in the 2-step seek operation, before switching from the magnetic head H0 to the magnetic head H3, the pre-seek is carried out by the magnetic head H0, there is no failure in the detection of the servo data, and the seek start is quicker than that in the 1-step seek operation.

With the 2-step seek operation, by starting the head change seek before the determination of the end of the pre-seek with the same head as that at time t2, it is possible to shorten the seek setting processing time. Consequently, regardless of the 2-step execution of the seek operation, it is possible to end the head change seek in less time than the seek end time in a case where the head change fails. In addition, in the 2-step seek operation, it is possible to prevent consecutive failure in the detection of the servo data and to prevent the generation of noise.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk apparatus comprising;
first and second magnetic disks each having servo patterns written thereon to provide plural zones for recording at different write frequencies;
a first magnetic head for the first magnetic disk;
a second magnetic head for the second magnetic disk; and
a controller configured to process a seek request that requires a change from the first magnetic head to the second magnetic head by first driving the first magnetic head to a stable region on the first magnetic disk and then changing a current magnetic head from the first magnetic head to the second magnetic head, wherein
the stable region is at least a predetermined distance from a zone boundary, the zone boundary being a region on the first magnetic disk at which servo patterns have been written with different write frequencies, and
the stable region has a servo pattern that has been written with a single write frequency.

2. The magnetic disk apparatus of claim 1, wherein the controller is configured to drive the second magnetic head to seek a target position of the seek request after changing the current magnetic head from the first magnetic head to the second magnetic head.

3. The magnetic disk apparatus according to claim 2, wherein the controller is configured to determine that the first magnetic head is within the predetermined distance from the zone boundary prior to driving the first magnetic head to the stable region on the first magnetic disk.

4. The magnetic disk apparatus according to claim 3, wherein the controller is configured to start the seeking to the target position before completion of the seeking in the stable region.

5. The magnetic disk apparatus of claim 1, wherein after the current magnetic head is changed from the first magnetic head to the second magnetic head, the second magnetic head performs a seek in a first zone that is one of the plural zones of the second magnetic disk.

6. A magnetic disk apparatus comprising:
a plurality of magnetic disks;
a plurality of magnetic heads respectively provided for the magnetic disks; and
a controller configured to process a seek request that requires a magnetic head change from a current head to a target head by first driving the current head to a stable region on the magnetic disk corresponding to the current head and then changing from the current head to the target head, wherein
the stable region is at least a predetermined distance from a zone boundary, the zone boundary being a region on the magnetic disk corresponding to the current head at which servo patterns have been written with different write frequencies, and
the stable region has a servo pattern that has been written with a single write frequency.

7. The magnetic disk apparatus of claim 6, wherein each of the magnetic disks has a plurality of concentric zones and the stable region is at least a predetermined number of tracks away from any of the boundaries between the concentric zones.

8. The magnetic disk apparatus of claim 7, wherein each of the concentric zones has servo patterns written thereon at different frequencies.

9. The magnetic disk apparatus of claim 8, wherein the frequencies of the servo patterns written on the concentric zones at outer portions of the magnetic disks are larger than the frequencies of the servo patterns written on the concentric zones at inner portions of the magnetic disks.

10. The magnetic disk apparatus of claim 7, wherein the controller is further configured to process the seek request with the target head at a position that is at least a predetermined number of tracks away from any of the boundaries between the concentric zones.

11. The magnetic disk apparatus of claim 7, wherein at the time the controller changes from the current head to the target head, the current head and the target head are positioned over concentric zones that have servo patterns written thereon at the same frequency.

12. A control method for first and second magnetic heads respectively corresponding to first and second magnetic disks of a magnetic disk apparatus comprising:
receiving a seek request that requires a change from the first magnetic head to the second magnetic head;
driving the first magnetic head to a stable region on the first magnetic disk, wherein
the stable region is at least a predetermined distance from a zone boundary, the zone boundary being a region on the first magnetic disk at which servo patterns have been written with different write frequencies, and the stable region has a servo pattern that has been written with a single write frequency; and
changing a current magnetic head from the first magnetic head to the second magnetic head.

13. The control method of claim 12, further comprising after said changing, driving the second magnetic head to seek a target position on the second magnetic disk associated with the seek request.

14. The control method of claim 12, further comprising:
determining a target position on the second magnetic disk associated with the seek request,
wherein said driving the first magnetic head to the stable region includes holding the target position and driving the first magnetic head to seek an amended position that is within the stable region.

15. The control method of claim 14, wherein each of the magnetic disks has a plurality of concentric zones and wherein the amended position is at least a predetermined distance away from concentric zone boundaries on the first magnetic disk.

16. The control method of claim 15, wherein at the time of changing the current magnetic head from the first magnetic head to the second magnetic head, the first and second magnetic heads are positioned over concentric zones that have servo patterns written thereon at the same frequency.

17. The magnetic disk apparatus according to claim 3, wherein the controller is further configured to, upon determining that the first magnetic head is within the predetermined distance from the zone boundary, drive the first magnetic head to the stable region on the first magnetic disk and then change the current magnetic head from the first magnetic head to the second magnetic head.

18. The magnetic disk apparatus according to claim 3, wherein the controller is further configured to, upon determining that the first magnetic head is more than the predetermined distance from the zone boundary, change the current magnetic head from the first magnetic head to the second magnetic head and drive the second magnetic head to seek a target position of the seek request.

19. The magnetic disk apparatus of claim 6, wherein the controller is configured to start the seeking to the target position before completion of the seeking in the stable region.

20. The control method of claim 12, further comprising, prior to completion of the step of driving the first magnetic head to the stable region on the first magnetic disk, driving the second magnetic head to seek a target position on the second magnetic disk associated with the seek request.

* * * * *